2,812,318

METHOD FOR GRANULAR POLYMERIZATION OF VINYL CHLORIDE

Richard M. Kreager, Avon Lake, and Edward J. Leeson, Lorain, Ohio, assignors to The B. F. Goodrich Company, New York, N. Y., a corporation of New York No Drawing. Application October 6, 1955,
Serial No. 539,005

5 Claims. (Cl. 260—92.8)

This invention relates to an improved method for effecting granular polymerization of vinyl chloride to produce a uniform finely divided polyvinyl chloride polymer with enhanced processing characteristics.

There is disclosed in U. S. Patent 2,494,517 to Naps, an improved method for effecting the granular polymerization of vinyl chloride. This method involves suspension polymerization of vinyl chloride monomer in a water-alcohol solution in the presence of a critical amount of a methyl ether of a polysaccharide. This patent teaches that the methyl ether of a polysaccharide is unique for the operability of the disclosed suspension process and that tests with a great variety of other stabilizing collodis did not result in the formation of the type of granular polyvinyl chloride obtained with the defined methyl ether of a polysaccharide.

We have now found that certain partially hydrolyzed polyvinyl esters can be successfully employed in the suspension polymerization of monomeric vinyl chloride in a water-alcohol solution to produce granular polyvinyl chloride of uniform particle size, and which has, quite unexpectedly, an improved rate of plasticizer absorption, greater even that that obtained with granular polyvinyl chloride produced by the aforementioned Naps process.

It is well known that successful suspension systems for polymerizing granular polyvinyl chloride must result in uniform particles or difficulties are experienced in handling and processing such materials. More important, most polyvinyl chloride is plasticized by mixing the polyvinyl chloride and plasticizer on a hot mill and it is well known that exposure of polyvinyl chloride to excessive heat causes decomposition of the polymer, and the rate at which the plasticizer is incorporated into the polyvinyl chloride is important so as to offset this effect. This rate of plasticization is enhanced when the particles of polyvinyl chloride are as uniform as possible and have a surface which enables them to take-up plasticizer and be fluxed. Further, it is essential that polyvinyl chloride used to make film be free of large particles of polyvinyl chloride which resist plasticizer absorption and fluxing. When granular polyvinyl chloride is prepared by the process of this invention a product of improved processing characteristics is obtained.

In the practice of this invention, vinyl chloride monomer and a small amount of an organic peroxide polymerization catalyst are suspended in water containing 35 to 65% by volume of methyl or ethyl alcohol, a small amount of partially hydrolyzed polyvinyl ester, and the suspension is vigorously agitated while being heated. The polyvinyl chloride resulting from this process is in the form of a fine powder of uniform particle size, said particles having a dull rough surface. The number of large non-uniform particles, which are quite undesirable, is very low, the particle size distribution being quite narrow and the polyvinyl chloride has a rapid rate of plasticizer absorption.

The amount of hydrolyzed polyvinyl ester and degree of hydrolysis are critical. The polyvinyl ester should be hydrolyzed to a degree between about 25 and 65%. The preferred polyvinyl ester is polyvinyl acetate which is hydrolyzed to from about 35 to 60%, more preferably 40 to 50%. The degree of hydrolysis is quite critical and in order to obtain granular polyvinyl chloride of the desired characteristics it is essential that the above-defined materials be employed. The molecular weight of the hydrolyzed polyvinyl acetate employed also is somewhat critical. The viscosity of these materials (an indication of molecular weight), is determined by the Hoeppler falling ball method of a 4% solution in water at 20° C., except in the case of those higher molecular weight products which are not readily soluble in water, in which case a 50/50 solution of water and isopropanol is employed. The viscosity of the partially hydrolyzed polyvinyl ester should be between 10 and 150, preferably between about 30 and 110. In experiments with hydrolyzed polyvinyl acetate which was 77, 88 and 98% hydrolyzed, in no case was the desired granular polyvinyl chloride obtained. Preferably the polyvinyl alcohol employed is derived from polyvinyl acetate by replacement of the acetate groups with hydroxyl groups to the defined degree. It is not absolutely accurate to call these reactions hydrolysis. The term probably more correctly employed would be alcoholysis. The polyvinyl alcohol products may be defined as those obtained by treating polyvinyl esters with an alkaline agent although such materials may be obtained by other techniques. Other polyvinyl esters, which although not preferred may be used to produce the desired polyvinyl alcohol, include polyvinyl propionate and polyvinyl butyrate.

The amount of hydrolyzed polyvinyl acetate employed based on the weight of monomers may be varied from 0.05 to 0.5 weight part. More preferably the amount employed is between about 0.075 and 0.15 weight part. Within these ranges the amount employed will be varied for three reasons: (1) For the effect upon particle size of the end polyvinyl chloride particles, that is, the particle size decreases if the amount of hydrolyzed polyvinyl acetate is increased, although within the defined range, uniform particles are obtained; (2) The degree of hydrolysis of the polyvinyl acetatae as defined above will control the amount used to some extent so that to obtain a given particle size polyvinyl chloride, generally with lower degree of hydrolysis in the polyvinyl acetate, slightly more will have to be used; and (3) There is a relation between the amount of hydrolyzed polyvinyl acetate employed and the degree of agitation of the polymerization suspension. Insofar as the particle size of the polyvinyl chloride is involved; that is, above minimum agitation required to prevent agglomeration of monomers and below a maximum degree of agitation which will divide monomer particles into droplets too small, as is well known to those skilled in the art, decrease in the amount of hydrolyzed polyvinyl acetate within the ranges set forth above results in increased particle sizes of polyvinyl chloride and vice-versa, increase in the amount of hydrolyzed polyvinyl acetate results in polyvinyl chloride of decreased particle size. These factors are well known to those skilled in the art of suspension polymerization of vinyl chloride monomer and are set forth herein only as required for a proper understanding of the present invention. Ordinarily vigorous agitation is satisfactory.

The suspending medium used in the process of this invention is a solution of alcohol and water. Ethyl or methyl alcohol may be employed, with methyl alcohol the preferred material. The solution may contain from about 35 to 65% by volume of alcohol, more preferably from about 40 to about 60% by volume of alcohol. A particularly valuable solution is a 50 volume percent solution of methyl alcohol and water. The total amount of alcohol-water solution employed may be varied from about 200 to about 500 weight parts per 100 weight parts of vinyl chloride monomer. More preferably about 100 weight parts of vinyl chloride monomer and about 225 to about 300 weight parts of alcohol-water solution are employed.

Although monomer containing 100% vinyl chloride is preferred for use in the process of this invention, minor amounts, preferably less than about 10% of other mono-olefinic monomers copolymerizable with vinyl chloride may be employed as desired. Such other monomers include vinyl bromide, vinyl acetate, vinylidene chloride, methyl methacrylate, octyl acrylate and the like. Preferably, however, the monomer mixture contains greater than 90% vinyl chloride.

The catalyst employed to initiate the polymerization reaction is not critical nor is the amount critical insofar as the process of this invention is concerned. Ordinarily the catalyst is an organic peroxide which is soluble in vinyl chloride monomer and is employed in amounts from about 0.1% to about 3% of vinyl chloride. Ordinarily more than about 0.1% of catalyst are required to sustain a reasonable reaction rate. When large amounts of catalyst are employed the physical properties of the polyvinyl chloride may be harmed and it is preferred that a minimum amount of catalyst be used to sustain a reasonable reaction rate. Useful organic peroxides for this purpose include lauroyl peroxide, acetyl peroxide, benzoyl peroxide, chlorobenzoyl peroxide and the like. Mixtures of peroxide may be used if desired.

The polymerization reactions are ordinarily conducted at temperatures between about 30° C. and 60° C. As is well known, the temperature of polymerization often depends on the type and concentration of catalyst employed. It is preferred, of course, that the lowest temperatures consistent with good polymerization rates should be employed. Ordinarily this would be between about 40 and 50° C.

Although batch polymerization is the normal process employed commercially for preparation of granular polyvinyl chloride resins the process of this invention is particularly adapted to continuous polymerization systems.

*Example I*

In a typical polymerization, 0.1 weight part of 45% hydrolyzed polyvinyl acetate, viscosity 105, is placed in a large stainless steel reactor. 139 weight parts of methanol is metered into the reactor and the two ingredients allowed to stand for several hours. 111 weight parts of water is then added, 0.2 weight part of lauroyl peroxide added and the reactor evacuated. 100 weight parts of vinyl chloride is then metered into the reactor which is heated to 49° C. After about 20 hours, during which time the mixture is vigorously agitated, a conversion of monomers to suspended, finely divided particles of polymer of 85% is obtained.

When Example I above is repeated with 0.25 part of 88% hydrolyzed polyvinyl acetate of a viscosity of about 5 the polymerization charge sets up solid in the reactor.

Polyvinyl chloride produced by polymerization of the above recipe is in the form of fine, uniform size and shape particles. 90% of the finely divided resin passes through a 100 mesh screen and about 50% through a 200 mesh screen. The particles are opaque and have a dull, rough surface. The amount of unfluxed particles in calendered sheets of this material is quite low. The polymer also has a very rapid rate of plasticizer absorption. In one test a sample of the polyvinyl chloride resin is spread on a thin glass slide and dioctyl phthalate plasticizer is dropped on the slide to wet all of the particles and the sample is evacuated to remove air bubbles. The slide is then placed on heated platens at 125° C. and the plasticization of the sample is observed under the microscope. The time required for complete plasticization, that is, from the time heating begins until the last particle disappears (is plasticized) of the polyvinyl chloride produced from the above recipe is 8 seconds. In contrast, polyvinyl chloride produced by the process of the Naps patent requires 10 to 40 seconds for complete plasticization and a regular production granular polyvinyl chloride known as Geon 101 requires 4 to 7 minutes for complete plasticization. Another measure of the degree of plasticizer absorption, which actually is a measure of the effective surface area available for plasticizer absorption, is the amount of butanol absorbed by given weight of polymer. In this test, 5 grams of polymer powder are titrated with butanol until the dry mass is converted to a damp mass. This end point is easily observed and the powder is shaken in a flask between addition of butanol. Polymer of several charges produced by the recipe given above absorbs from 2.2 to 2.6+ cubic centimeters of butanol per 5 gram sample. In contrast polyvinyl chloride produced by the process of the Naps patent absorbs about 2.0 cc. of butanol per 5 gram sample. Geon 101, absorbs 0.4 to 0.6 cc. of butanol per 5 gram sample.

*Example II*

A series of charges similar to that described in Example I are made in a 15 gallon stirred pressure reactor. 0.115 part of 46% hydrolyzed polyvinyl alcohol and 250 parts of methanol/water solution of varying ratios are employed. In each case uniform, finely divided particles of polyvinyl chloride are obtained which are free of large and tough to plasticize particles. The table below summarizes the properties of the polymer produced in each case.

| Methanol-Water (Volume) | | Butanol Absorption, cc./5 grams | Specific Viscosity |
|---|---|---|---|
| 45 | 55 | 2.9 | 0.53 |
| 50 | 50 | 3.0 | 0.51 |
| 55 | 45 | 2.5 | 0.47 |

*Example III*

In another reactor charge similar to that of Example I, use of 0.115 weight part of 36% hydrolyzed polyvinyl alcohol results in a finely divided polymer product of uniform particle size distribution which has a butanol absorption value of 2.4.

It is obvious from the above that the process of the present invention provides an improved granular polyvinyl chloride over those known to the art in two respects, (1) the particle size distribution is quite narrow, and (2) enhanced and more uniform plasticizer absorption is noted. These characteristics of polyvinyl chloride are even more noticeable when large batches of polyvinyl chloride are mixed with plasticizer. Plasticization of the polyvinyl chloride takes place more rapidly, more completely and at lower temperatures than is possible with present available granular polyvinyl chloride and calendered sheets of such compositions are much more free of unfluxed or unplasticized particles of polyvinyl chloride.

It is apparent that the present invention resides in the novel use of critical amounts of the defined polyvinyl alcohol for the production of improved granular polyvinyl chloride and it will be apparent to the man skilled in the art that numerous modifications may be made in addition to the specific embodiments set forth hereinabove without departing from the spirit and scope of the invention as it is defined in the appended claims.

We claim:

1. In the process for producing granular polymers of vinyl chlorde having substantially uniform particle size which comprises agitating and polymerizing dispersed liquid vinyl chloride in an aqueous alcohol medium containing an alcohol selected from the group consisting of methyl and ethyl alcohol in the presence of a small amount of an organic peroxide polymerization catalyst, the improvement which comprises conducting the polymerization in the presence of about 0.05 to 0.5 weight part, per 100 weight parts of monomer, of a polyvinyl ester hydrolyzed to a degree between about 25 and 65%.

2. In the process for producing granular polymers of vinyl chloride having substantially uniform particle size which comprises agitating and polymerizing dispersed liquid vinyl chloride in an aqueous alcohol medium containing an alcohol selected from the group consisting of methyl and ethyl alcohol in the presence of a small amount of an organic peroxide polymerization catalyst, the improvement which comprises conducting the polymerization in the presence of about 0.05 to 0.5 weight part, per 100 weight parts of monomer, of a polyvinyl ester hydrolyzed to a degree between about 25 to 60%.

3. In the process for producing granular polyvinyl chloride having substantially uniform particle size which comprises agitating and polymerizing dispersed liquid vinyl chloride in an aqueous alcohol medium containing about 35 to 65% by volume of an alcohol selected from the group consisting of methyl alcohol and ethyl alcohol in the presence of a small amount of an organic peroxide catalyst, the improvement which comprises conducting the polymerization in the presence of about 0.05 to 0.5 weight part, per 100 weight parts of vinyl chloride, of polyvinyl acetate hydrolyzed to a degree from about 35 to 60%.

4. In the process for producing granular polyvinyl chloride having substantially uniform particle size which comprises agitating and polymerizing dispersed liquid vinyl chloride in an aqueous alcohol medium containing about 40 to 60% by volume of methyl alcohol in the presence of a small amount of an organic peroxide catalyst, the improvement which comprises conducting the polymerization in the presence of about 0.075 to 0.15 weight part, per 100 weight parts of vinyl chloride, of polyvinyl acetate hydrolyzed to a degree from about 40 to 50%.

5. In the process for producing granular polyvinyl chloride having substantially uniform particle size which comprises agitating and polymerizing 100 weight parts of liquid vinyl chloride dispersed in about 225 to 300 weight parts of an aqueous alcohol medium containing about 50% by volume of methyl alcohol in the presence of a small amount of an organic peroxide catalyst, the improvement which comprises conducting the polymerization in the presence of about 0.10 weight part of polyvinyl alcohol derived from polyvinyl acetate hydrolyzed to a degree from about 40 to 50%.

References Cited in the file of this patent

UNITED STATES PATENTS

| | | |
|---|---|---|
| 2,462,422 | Plambeck | Feb. 22, 1949 |
| 2,473,929 | Wilson | June 21, 1949 |
| 2,494,517 | Naps | Jan. 10, 1950 |